(12) United States Patent
Cavallo

(10) Patent No.: US 7,562,188 B2
(45) Date of Patent: Jul. 14, 2009

(54) RAID POWER SAFE APPARATUS, SYSTEMS, AND METHODS

(75) Inventor: Joseph S. Cavallo, Waltham, MA (US)

(73) Assignee: Intel Corporation, Santa Clara, CA (US)

( * ) Notice: Subject to any disclaimer, the term of this patent is extended or adjusted under 35 U.S.C. 154(b) by 401 days.

(21) Appl. No.: 11/155,295

(22) Filed: Jun. 17, 2005

(65) Prior Publication Data

US 2006/0288161 A1 Dec. 21, 2006

(51) Int. Cl.
G06F 12/00 (2006.01)
G06F 12/08 (2006.01)
G06F 12/16 (2006.01)

(52) U.S. Cl. .................. 711/114; 711/112; 711/143; 714/E11.105; 714/E11.088

(58) Field of Classification Search ............ None
See application file for complete search history.

(56) References Cited

U.S. PATENT DOCUMENTS

| | | | |
|---|---|---|---|
| 5,452,444 A | 9/1995 | Solomon et al. | |
| 5,574,882 A | 11/1996 | Menon et al. | |
| 5,778,426 A | 7/1998 | DeKoning et al. | |
| 5,911,779 A | 6/1999 | Stallmo et al. | |
| 6,032,263 A | 2/2000 | Yamamoto et al. | |
| 6,041,423 A | 3/2000 | Tsukerman | |
| 6,073,218 A | 6/2000 | DeKoning et al. | |
| 6,101,615 A | 8/2000 | Lyons | |
| 6,334,168 B1 | 12/2001 | Islam et al. | |
| 6,473,867 B2 | 10/2002 | Yamamoto et al. | |
| 6,675,318 B1 | 1/2004 | Lee | |
| 6,785,771 B2 * | 8/2004 | Ash et al. ................ | 711/114 |
| 6,807,642 B2 | 10/2004 | Yamamoto et al. | |
| 7,185,128 B1 | 2/2007 | Kotlowski et al. | |
| 7,197,599 B2 | 3/2007 | Corrado et al. | |
| 2001/0002480 A1 | 5/2001 | DeKoning et al. | |
| 2003/0041211 A1 * | 2/2003 | Merkey et al. ............ | 711/114 |
| 2005/0144381 A1 | 6/2005 | Corrado | |
| 2006/0236029 A1 | 10/2006 | Corrado et al. | |
| 2006/0282700 A1 | 12/2006 | Cavallo | |
| 2007/0028044 A1 * | 2/2007 | Hetrick et al. ............ | 711/114 |

FOREIGN PATENT DOCUMENTS

WO WO-2006/113823 A2 10/2006

OTHER PUBLICATIONS

"Intel® 80303 I/O Processor", *Datasheet*, (Jun. 2002), 56 pgs.

(Continued)

*Primary Examiner*—Sanjiv Shah
*Assistant Examiner*—Midys Rojas
(74) *Attorney, Agent, or Firm*—Christopher K. Gagne

(57) ABSTRACT

Apparatus and systems, as well as methods and articles, may operate to sequence write operations and journal a portion of write data in a dual-parity redundant array of inexpensive disks (RAID) sub-system such that one or more parity strips in a stripe are consistent with target stripe data during the write operations, such that the consistency of the parity strips is determinant following an unexpected RAID sub-system reset occurring during the write operations, and such that the parity strips and the target stripe data are recoverable following a disk drive failure and a power failure occurring during the write operations.

30 Claims, 3 Drawing Sheets

OTHER PUBLICATIONS

"PCI Local Bus Specification", *Revision 2.3*, PCI Special Interest Group, Portland, OR,(Mar. 29, 2002),328 pgs.

Deyring, K.-P., "Serial ATA: High Speed Serialized AT Attachment", *Revision 1.0*, (Aug. 29, 2001), 307 pgs.

Elliott, R. C., "Information Technology—Serial Attached SCSI (SAS)", *Working Draft, American National Standard*—Project T10/1562-D (Revision 5), (Jul. 9, 2003), 464 pgs.

Nelson, J., "Fibre Channel—Framing and Signaling (FC-FS)", *FC-FS Draft Sandard*, Rev. 1.90, (Apr. 9, 2003), 64 pgs.

Patterson, D. A., et al., "A Case for Redundant Arrays of Inexpensive Disks (RAID)", *ACM SIGMOD International Conference on Management of Data*, (Jun. 1988), 109-116.

"Non-Final Office Action for U.S. Appl. No. 11/150,832 mailed on Apr. 10, 2008, 8 pages".

* cited by examiner

RAID POWER SAFE APPARATUS, SYSTEMS, AND METHODS

TECHNICAL FIELD

Various embodiments described herein relate to digital mass storage generally, including apparatus, systems, and methods used to write to a redundant disk array.

BACKGROUND INFORMATION

A redundant array of inexpensive disks level six (RAID-6) sub-system may utilize two redundancy strips, parity and Q, in a stripe to aid in reconstructing a RAID volume in case of a single or double disk drive failure. A RAID controller operating to update a data strip in the stripe may be required to update parity and Q associated with the stripe to ensure that the data is doubly protected. If an unexpected reset (e.g., a reset caused by a power failure) intervenes while the write is in progress, it may be difficult to determine which updates have been completed. Thus parity and Q associated with the affected stripe may both require re-calculation at the next re-boot following the power failure. Data in the strip targeted by the write in progress may be indeterminate, since the write to the targeted strip may have been interrupted by the power failure. However, data on parallel strips in the stripe may be unaffected by the power failure. If both the power and a disk drive fail during write operations, upon re-boot both parity and Q may be indeterminate. In the latter case, the entire volume may be failed since it may not be possible to rebuild the stripe correctly.

DETAILED DESCRIPTION

Figure 1:
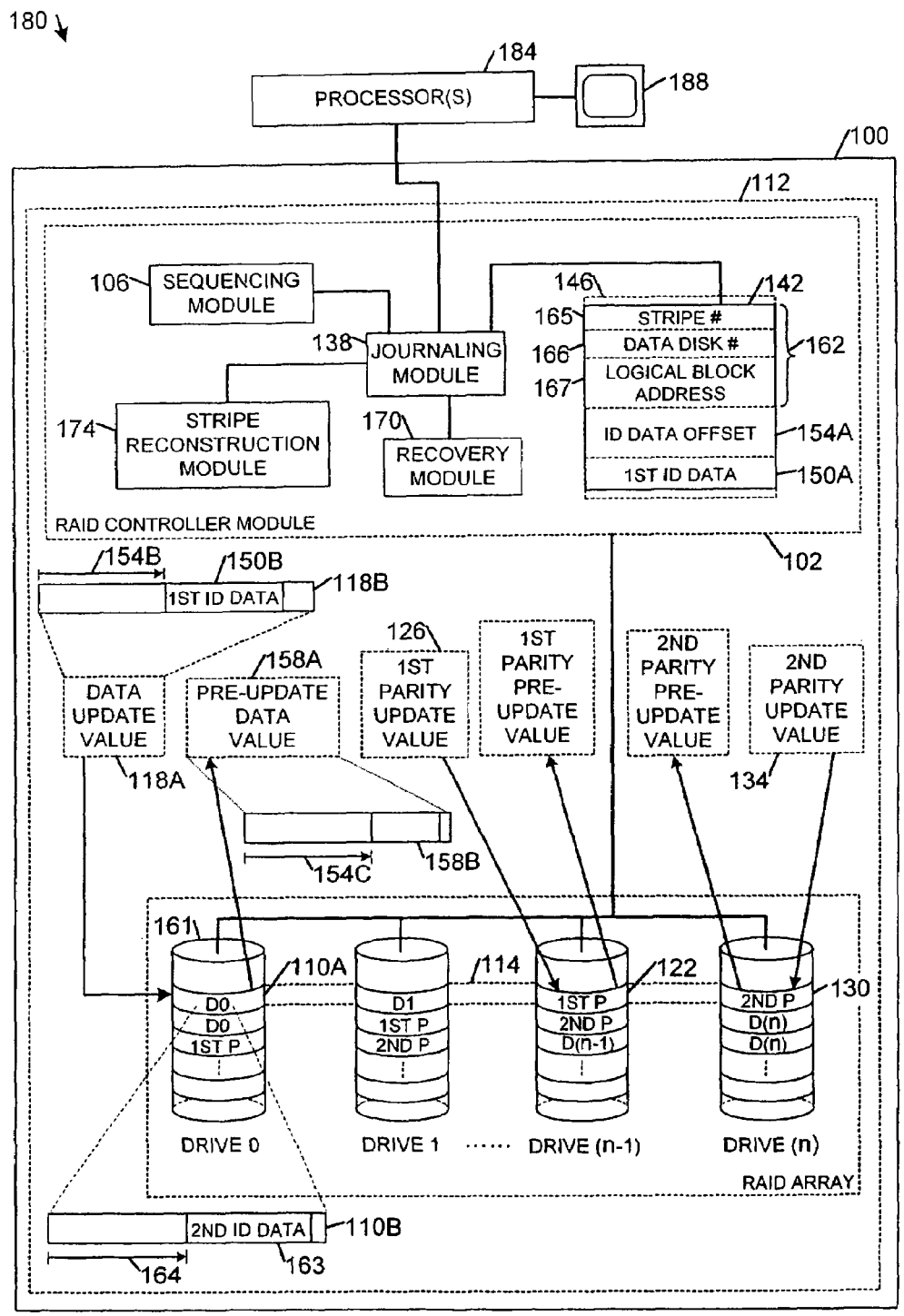
FIG. 1 is a block diagram of an apparatus and a representative system according to various embodiments of the invention.

FIG. 1 comprises a block diagram of an apparatus 100 and a system 180 according to various embodiments of the invention. It should be noted that some embodiments described herein may apply to RAID-6 sub-systems. The terms "first parity" and "second parity" used herein for generality may sometimes be referred to as "parity" and "Q" in a RAID-6 context. Some embodiments of the invention may operate to recover from an unexpected reset (e.g., caused by a power failure, an operating system crash, or component failure) and a single disk drive failure occurring while RAID writes are in progress. Recovery may proceed by determining whether parity, Q, or both are valid upon re-boot following the unexpected reset. For purposes described herein, "valid" means capable of being combined with other strips in a stripe to reconstruct a damaged or missing strip. The strip could be missing as a result of disk failure or unavailability, for example.

Some embodiments of the invention may make a record, sometimes referred to herein as a "dirty stripe journal," of a stripe affected by a write in progress before the write is allowed to update parity, Q, or data on a target disk. The record may be saved to non-volatile memory, to disk, or to other non-volatile storage to be used to determine which stripes require parity and Q re-calculations upon re-boot. Some embodiments of the invention may operate to order data, parity and Q updates such that parity, Q, or both are valid during write operations affecting an associated data strip. Information about the write in progress may be added to the dirty stripe journal such that the validity of parity and Q can be determined upon re-boot following the unexpected reset.

In some embodiments of the invention, ordering may be enforced such that parity is updated on a target disk 161 before a data update, and Q is updated following the data update. As a result, both parity and Q may be valid before the updates, Q may be valid following the parity update and before the data update, and parity but not Q may be valid following the data update but before the Q update. Both parity and Q may again be valid following the Q update.

Some embodiments of the invention may thus write a record valid for recovery from a power failure occurring between a time of writing the record and a time of completing target disk updates. Calculations to determine parity and Q update values may require that pre-update data be read before overwriting a strip with update data. The pre-update data and the update data may thus exist in memory simultaneously. Some embodiments may search the pre-update data and the update data for a first data increment (e.g., a one-byte sample) that differs between the two. A note may be made in the dirty stripe journal to identify this sample either by its update data value or by its pre-update data value and by its location as an offset from the start of the data strip.

For the sequence of write operations described above, an equality between the journaled sample and the identified sample in the data strip may indicate that parity is valid upon re-boot. Thus, parity may be used to reconstruct both the data strip and the Q strip in the target stripe. Likewise, an inequality between these values may indicate that Q is valid. In the latter case, Q may be used to reconstruct both the data strip and the parity strip for the affected stripe. Some embodiments of the invention may reverse the sequence of writing parity and Q. That is, Q may be updated first, and then data may be updated followed by parity. In the latter case, an equality between the journaled sample and the identified sample in the data strip may indicate that Q is valid upon re-boot. An inequality between the two values may indicate that parity is valid upon re-boot. A similar result may obtain if pre-update data is journaled rather than update data, with the parity and Q equalities reversed.

An example method may journal update data and may assume both parity and Q to be valid prior to updates to a target stripe 114. First, the dirty stripe journal may be updated with the update data value. Since the data strip contains pre-update data at this point, a comparison between the journal and the data strip upon re-boot may indicate that Q is valid. (Note that both parity and Q may be valid at this point.) The example method may next update parity. Now only Q may be valid. The example method may next update the data strip. Since the data strip contains the update data, only parity may be valid. The example method may next update Q. Since the journaled sample value is now equivalent to its counterpart written to the data strip, the method may indicate parity to be valid. (Note that both parity and Q may be valid at this point.) The example method may next clear the entry associated with the target data strip from the dirty stripe journal. The method may indicate by the cleared status that no write is in progress on the affected stripe, and that both parity and Q are thus valid. The dirty stripe journal may be written to a disk drive, to non-volatile random-access memory (NVRAM), or elsewhere to be used for later analysis following an unexpected reset.

Data may be recovered during a re-boot following an unexpected reset if a disk drive within the RAID sub-system is first detected as failed during the re-boot. The journaled sample data and its expected location on the data strip may be read from the dirty stripe journal following the re-boot. The sample data may also be read from the expected location within the target data strip. The two versions of sample data may then be compared to determine whether parity or Q is valid, and which should be used to reconstruct the other as well as the data strip. If the failed disk is a parity or Q strip for the stripe, then the data strip may still be intact. The stripe may thus have survived both the disk failure and the unexpected reset. If the failed disk is the target data disk, parity, Q, or both may be used to reconstruct the data strip. Some embodiments and methods disclosed herein may treat operations affecting more than one data strip in a stripe as two separate writes, one to each strip. Some embodiments and methods may write a journal entry for each "atomic" portion of a data strip. That is, the journal entry may be written for a portion of a strip update specified by the target disk drive characteristics to complete following the unexpected reset.

In some embodiments, the apparatus 100 may include logic 102 in a RAID sub-system 112, including perhaps a dual-parity RAID sub-system. The RAID sub-system 112 may be capable of sequencing write operations and journaling a portion of write data such that one or more parity strips in a target stripe are consistent with target stripe data during the write operations. Write operations and journaling may proceed such that the consistency of the parity strips is determinant following an unexpected RAID sub-system reset occurring during the write operations. The logic may enable the RAID sub-system 112 to recover the parity strips and the target stripe data following a disk drive failure and a power failure occurring during the write operations.

The apparatus 100 may include a sequencing module 106 to establish an order of operations associated with a disk drive update to a data strip 110A, 110B in a RAID sub-system 112, including perhaps a RAID-6 sub-system. The data strip 110A may be associated with the stripe 114, and may be updated with a data strip update value 118A, 118B. An update may also be made to a first parity strip 122 associated with the stripe 114 using a first parity strip update value 126. Additionally, an update may be made to a second parity strip 130 associated with the stripe 114 using a second parity strip update value 134. The sequencing module 106 may order the update operations such that the update to the first parity strip 122 is written before writing the update to the data strip 110A, and the update to the second parity strip 130 is written after writing the update to the data strip 110A.

The apparatus 100 may also include a journaling module 138 coupled to the sequencing module 106 to create a journal entry 142 in a non-volatile storage medium 146 before writing the update to the first parity strip 122. The journal entry 142 may comprise first identifying data 150A, 150B within the data strip update value 118A, 118B located at a first offset 154A, 154B into the data strip update value 118A, 118B. The first identifying data 150A, 150B may be selected such that a comparison between the data strip update value 118A, 118B and a pre-update data value 158A, 158B read from the data strip 110A results in an inequality at the first offset 154A, 154B, 154C.

The journal entry 142 may further comprise location information 162 to locate second identifying data 163 within the data strip 110A, 110B at a second offset 164 equal to the first offset 154A, 154B, 154C upon re-boot following an unexpected RAID sub-system reset. The location information 162 may comprise a stripe identification value 165, a disk drive identification value 166 associated with a disk drive 161 containing the data strip 110A, and a logical block address 167.

The apparatus 100 may further include a recovery module 170 coupled to the journaling module 138 to analyze the journal entry 142 upon re-boot following the unexpected RAID sub-system reset. The unexpected reset may occur during the disk drive updates, and during the re-boot a single disk drive may be detected as failed.

The apparatus 100 may also include a stripe reconstruction module 174 coupled to the journaling module 170 to reconstruct one or more of the first parity strip 122, the second parity strip 130, and the data strip 110A. Reconstruction operations may utilize a plurality of strips from non-failed disks in the stripe 114, the first identifying data 150A of the data strip update value 118A read from the journal entry 142, or both.

In another embodiment, a system 180 may comprise one or more of the apparatus 100, including logic 102 and a sequencing module 106 to establish an order of operations associated with disk drive updates. The updates may be made to a data strip 110A using a data strip update value 118A, to a first parity strip 122 using a first parity strip update value 126, and to a second parity strip 130 using a second parity strip update value 134, as previously described. In some embodiments of the system 180, the first parity strip 122 may comprise a Q strip and the first parity strip update value 126 may comprise a Q strip update value. In other system 180 embodiments, the second parity strip 130 may comprise the Q strip and the second parity strip update value 134 may comprise the Q strip update value.

The system 180 may also include a journaling module 138 and a recovery module 170, as previously described. In some embodiments of the system 180, the recovery module 170 may be included in a basic input-output system associated with a RAID sub-system.

The system 180 may further include one or more processor(s) 184 coupled to the journaling module 138 to provide the data strip update value 118A, and a display 188 coupled to the processor(s) 184 to display the data strip update value 118A. The display 188 may comprise a cathode ray tube display or a solid-state display such as a liquid crystal display, a plasma display, or a light-emitting diode display, among others.

Any of the components previously described can be implemented in a number of ways, including embodiments in software. Thus, the apparatus 100; logic 102; sequencing module 106; data strip 110A, 110B; RAID sub-system 112; stripe 114; update values 118A, 118B, 126, 134; parity strips 122, 130; journaling module 138; journal entry 142; non-volatile storage medium 146; identifying data 150A, 150B, 163; offsets 154A, 154B, 154C, 164; pre-update data value 158A, 158B; disk drive 161; location information 162; identification values 165, 166; logical block address 167; recovery module 170; stripe reconstruction module 174; system 180; processor(s) 184; and display 188 may all be characterized as "modules" herein.

The modules may include hardware circuitry, single or multi-processor circuits, memory circuits, software program modules and objects, firmware, and combinations thereof, as desired by the architect of the apparatus 100 and system 180 and as appropriate for particular implementations of various embodiments. Thus, the modules may be included in a system operation simulation package such as a software electrical signal simulation package, a power usage and distribution simulation package, a capacitance-inductance simulation package, a power/heat dissipation simulation package, a signal transmission-reception simulation package, or any combination of software and hardware used to simulate the operation of various potential embodiments. These simulations may be used to characterize or test the embodiments, for example.

It should also be understood that the apparatus and systems of various embodiments can be used in applications other than RAID disk sub-system update and recovery operations. Thus, various embodiments of the invention are not to be so limited. The illustrations of apparatus 100 and system 180 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers, workstations, radios, video players, vehicles, and others. Some embodiments may include a number of methods.

Figure 2:
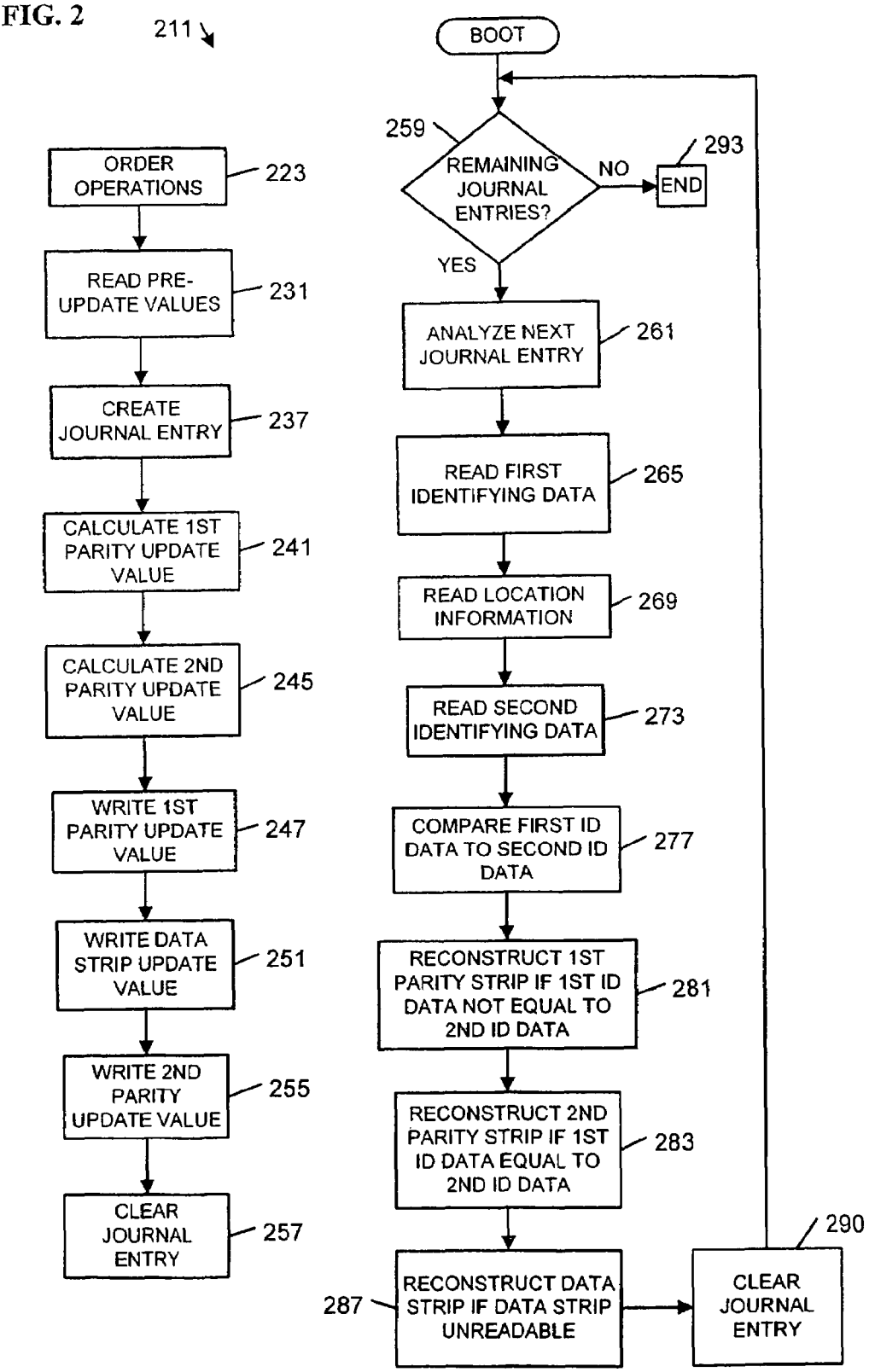
FIG. 2 is a flow diagram illustrating several methods according to various embodiments of the invention.

FIG. 2 is a flow diagram illustrating several methods according to various embodiments of the invention. One such method may include sequencing write operations and journaling a portion of write data in a dual-parity RAID sub-system such that one or more parity strips in a stripe are consistent with target stripe data during the write operations. Write operations and journaling may proceed such that the consistency of the parity strips is determinant following an unexpected RAID sub-system reset occurring during the write operations. Consequently, the parity strips and the target stripe data may be recoverable following a disk drive failure and a power failure occurring during the write operations.

The method 211 may begin at block 223 with ordering operations associated with disk drive updates in a RAID sub-system. The operations may include updates to a data strip associated with a stripe using a data strip update value. The operations may also include updates to a first parity strip associated with the stripe using a first parity strip update value and updates to a second parity strip associated with the stripe using a second parity strip update value. Ordering may proceed such that the update to the first parity strip is written before writing the update to the data strip and the update to the second parity strip is written after writing the update to the data strip.

The method 211 may also include reading a pre-update value from the data strip, a pre-update value from the first parity strip, and a pre-update value from the second parity strip, at block 231. The pre-update value from the data strip may be read before creating a journal entry.

The method 211 may further include creating the journal entry in a non-volatile storage medium before writing the update to the first parity strip, at block 237. The journal entry may comprise first identifying data within the data strip update value located at a first offset into the data strip update value. The first identifying data may be selected such that a comparison between the data strip update value and the pre-update data value read from the data strip results in an inequality at the first offset.

The journal entry may further comprise location information to locate second identifying data within the data strip at a second offset equal to the first offset upon re-boot following an unexpected RAID sub-system reset. The location information may comprise one or more of a stripe identification value, a disk drive identification value associated with a disk drive containing the data strip, and a logical block address. The first offset and the second offset may comprise byte counts.

The method 211 may proceed at block 241 with calculating the first parity strip update value using the pre-update value from the first parity strip, the pre-update value from the data strip, and the data strip update value. The first parity strip update value may be calculated after reading the pre-update value from the first parity strip and before writing the first parity strip update value. The method 211 may continue at block 245 with calculating the second parity strip update value using the pre-update value from the second parity strip, the pre-update value from the data strip, and the data strip update value. The second parity strip update value may be calculated after reading the pre-update value from the second parity strip and before writing the second parity strip update value.

The method 211 may also include writing the first parity strip update value to the first parity strip after calculating the first parity strip update value and before writing the data strip update value, at block 247. The method 211 may further include writing the data strip update value to the data strip after writing the first parity strip update value to the first parity strip and before writing the second parity strip update value to the second parity strip, at block 251. The method 211 may proceed at block 255 with writing the second parity strip update value to the second parity strip after writing the data strip update value to the data strip, and may continue at block 257 with clearing the journal entry, perhaps after writing the second parity strip update value.

The method 211 may also include analyzing journal entries if an unexpected RAID sub-system reset occurs during disk drive update operations and possibly if during a re-boot following the reset a single disk drive is detected as failed, at block 261. The unexpected reset condition may be tested for during RAID sub-system boot operations or subsequently at block 259, wherein the existence of journal entries may indicate that the unexpected reset has occurred. The method 211 may include reading the first identifying data from the journal entry, at block 265. The method 211 may also include reading the location information from the journal entry to locate the second identifying data within the data strip, at block 269. The method 211 may further include reading the second identifying data from the data strip, at block 273.

The method 211 may continue at block 277 with comparing the first identifying data to the second identifying data. The method 211 may include reconstructing the first parity strip using strips from non-failed disks in the stripe if the first identifying data is not equal to the second identifying data, at block 281. The method 211 may also include reconstructing the second parity strip using strips from non-failed disks in the stripe if the first identifying data is equal to the second identifying data, at block 283. The method 211 may proceed at block 287 with reconstructing the data strip using strips from non-failed disks in the stripe if the second identifying data cannot be read from the data strip. The method 211 may continue at block 290 with clearing the journal entry following the analysis of the journal entry and any data or parity strip reconstruction necessitated thereby. The method 211 may continue further with an analysis of additional journal entries and associated strip reconstruction activities at blocks 261-290, for as long as the additional journal entries remain. The method 211 may conclude at block 293 when no additional journal entries remain.

Some versions of the method 211 may describe operations associated with a RAID-6 sub-system. Operations may be ordered such that first parity is journaled and written before second parity, as described above. Alternatively, operations may be ordered such that second parity is journaled and written first. Thus, the second parity strip may comprise a Q strip, the pre-update value from the second parity strip may comprise a pre-update value read from the Q strip, and the second parity strip update value may comprise a Q strip update value. Alternatively, the first parity strip may comprise a Q strip, the pre-update value from the first parity strip may comprise a pre-update value read from the Q strip, and the first parity strip update value may comprise a Q strip update value.

It may be possible to execute the activities described herein in an order other than the order described. And, various activities described with respect to the methods identified herein can be executed in repetitive, serial, or parallel fashion. Information including parameters, commands, operands, and other data can be sent and received in the form of one or more carrier waves.

One of ordinary skill in the art will understand the manner in which a software program can be launched from a computer-readable medium in a computer-based system to execute the functions defined in the software program. Various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 3 below.

Figure 3:
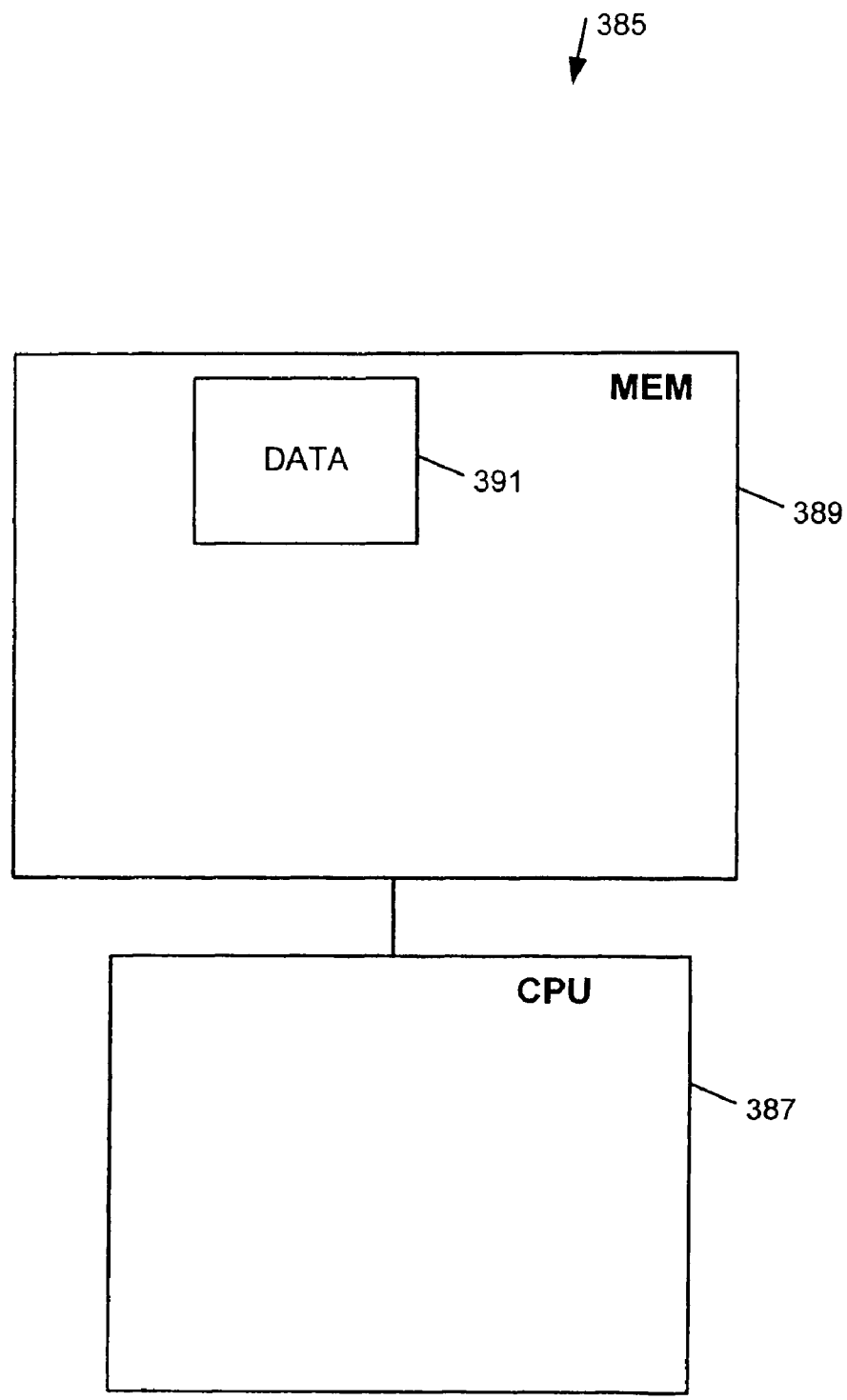
FIG. 3 is a block diagram of an article according to various embodiments of the invention.

FIG. 3 is a block diagram of an article 385 according to various embodiments of the invention. Examples of such embodiments may comprise a computer, a memory system, a magnetic or optical disk, some other storage device, or any type of electronic device or system. The article 385 may include one or more processor(s) 387 coupled to a machine-accessible medium such as a memory 389 (e.g., a memory including electrical, optical, or electromagnetic elements). The medium may contain associated information 391 (e.g., computer program instructions, data, or both) which, when accessed, results in a machine (e.g., the processor(s) 387) sequencing write operations in a dual-parity RAID sub-system, journaling a portion of write data, determining a consistency of one or more parity strips following an unexpected RAID sub-system reset occurring during the write operations, and recovering from the unexpected reset, as previously described.

Implementing the apparatus, systems, and methods disclosed herein may operate to order and to journal RAID sub-system disk write operations to enable recovery from a power failure and a single disk drive failure occurring while the write operations are in progress.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus, including:

one or more processors coupled to machine-accessible memory in a dual-parity redundant array of inexpensive disks (RAID) sub-system, the memory storing information that when accessed by the one or more processors results in the one or more processors sequencing write operations in the RAID sub-system and journaling in a dirty stripe journal in a non-volatile storage medium a portion of write data for a data strip in the RAID sub-system affected by a RAID write in progress, the journaling occurring before the RAID write is allowed to update the write data and associated parity information and Q information in the RAID sub-system, the dirty stripe journal including additional information to be compared by the apparatus with the data strip to determine following an unexpected RAID sub-system reset occurring during the RAID write in progress both (1) which of the parity information and Q information is validly usable to reconstruct an invalid strip in the RAID sub-system and (2) whether the RAID write is in progress, the write operations and the journaling being sequenced such that at least one parity strip in a target stripe is consistent with target stripe data during the write operations, such that the consistency of each one of the at least one parity strip is determinant following the unexpected RAID sub-system reset and such that the at least one parity strip and the target stripe data are recoverable following both a disk drive failure and a power failure occurring while the write operations are in progress;

wherein the information stored in the machine-accessible memory when accessed by the one or more processors also results in the one or more processors:

establishing an order of operations associated with disk drive updates to a data strip associated with the stripe using a data strip update value, to a first parity strip associated with the stripe using a first parity strip update value, and to a second Q parity strip associated with the stripe using a second Q parity strip update value in the RAID sub-system such that the update to the first parity strip is written before writing the update to the data strip and the update to the second Q parity strip is written after writing the update to the data strip, the stripe being reconstructable based upon the first parity strip and the second Q parity strip; and creating a journal entry in the non-volatile storage medium before writing the update to the first parity strip.

2. The apparatus of claim 1, wherein:

the journal entry comprises first identifying data within the data strip update value located at a first offset into the data strip update value, the first identifying data selected such that a comparison between the data strip update value and a pre-update data value read from the data strip results in an inequality at the first offset, and wherein the journal entry further comprises location information to locate second identifying data within the data strip at a second offset equal to the first offset upon re-boot following the unexpected RAID sub-system reset.

3. The apparatus of claim 2, wherein the information stored in the machine-accessible memory when accessed by the one or more processors results in the one or more processors:

analyzing the journal entry upon re-boot following the unexpected RAID sub-system reset, wherein the unexpected reset occurs during the disk drive updates, and wherein during the re-boot a single disk drive is detected as failed.

4. The apparatus of claim 2, wherein the information stored in the machine-accessible memory when accessed by the one or more processors results in the one or more processors:

reconstructing at least one of the first parity strip, the second parity strip, and the data strip using at least one of a plurality of strips from non-failed disks in the stripe and the first identifying data read from the journal entry.

5. The apparatus of claim 2, wherein the RAID sub-system comprises a RAID-6 sub-system.

6. The apparatus of claim 2, wherein the location information further comprises:

a stripe identification value;

a disk drive identification value associated with a disk drive containing the data strip; and a logical block address.

7. A system, including:

one or more processors coupled to machine-accessible memory in a dual-parity redundant array of inexpensive disks (RAID) sub-system, the memory storing information that when accessed by the one or more processors results in the one or more processors sequencing write operations in the RAID sub-system and journaling in a dirty stripe journal in a non-volatile storage medium a portion of write data for a data strip in the RAID sub-system affected by a RAID write in progress, the journaling occurring before the RAID write is allowed to update the write data and associated parity information and Q information in the RAID sub-system, the dirty stripe journal including additional information to be compared by the apparatus with the data strip to determine following an unexpected RAID sub-system reset occurring during the RAID write in progress both (1) which of the parity information and Q information is validly usable to reconstruct an invalid strip in the RAID sub-system and (2) whether the RAID write is in progress, the write operations and the journaling being sequenced such that at least one parity strip in a target stripe is consistent with target stripe data during the write operations, such that the consistency of each one of the at least one parity strip is determinant following the unexpected RAID sub-system reset such that the at least one parity strip and the target stripe data are recoverable following both a disk drive failure and a power failure occurring while the write operations are in progress;

the one or more processors also providing the write data; and a display coupled to the one or more processors;

wherein the information stored in the machine-accessible memory when accessed by the one or more processors also results in the one or more processors:

establishing an order of operations associated with disk drive updates to a data strip associated with the stripe using a data strip update value, to a first parity strip associated with the stripe using a first parity strip update value, and to a second Q parity strip associated with the stripe using a second Q parity strip update value in the RAID sub-system such that the update to the first parity strip is written before writing the update to the data strip and the update to the second Q parity strip is written after writing the update to the data strip, the stripe being reconstructable based upon the first parity strip and the second Q parity strip; and creating a journal entry in the non-volatile storage medium before writing the update to the first parity strip.

8. The system of claim 7, wherein:

the journal entry comprises first identifying data within the data strip update value located at a first offset into the data strip update value, the first identifying data selected such that a comparison between the data strip update value and a pre-update data value read from the data strip results in an inequality at the first offset, and wherein the journal entry further comprises location information to locate second identifying data within the data strip at a second offset equal to the first offset upon re-boot following the unexpected RAID sub-system reset.

9. The system of claim 8, wherein the information stored in the machine-accessible memory when accessed by the one or more processors results in the one or more processors:

analyzing the journal entry upon re-boot following the unexpected RAID sub-system reset, wherein the unexpected reset occurs during the disk drive updates, and wherein during the re-boot a single disk drive is detected as failed.

10. A method, including:

sequencing write operations and journaling in a dirty stripe journal a portion of write data in a dual-parity redundant array of inexpensive disks (RAID) sub-system, the write data being for a data strip in the RAID sub-system affected by a RAID write in progress, the journaling occurring before the RAID write is allowed to update the write data and associated parity information and Q information in the RAID sub-system, the dirty stripe journal including additional information to be compared by the apparatus with the data strip to determine following an unexpected RAID sub-system reset occurring during the RAID write in progress both (1) which of the parity information and Q information is validly usable to reconstruct an invalid strip in the RAID sub-system and (2) whether the RAID write is in progress, the write operations and the journaling being sequenced such that at least one parity strip in a stripe is consistent with target stripe data during the write operations, such that the consistency of each one of the at least one parity strip is determinant following the unexpected RAID sub-system reset, and such that the at least one parity strip and the target stripe data are recoverable following both a disk drive failure and a power failure occurring while the write operations are in progress;

ordering operations associated with disk drive updates to (a) a data strip associated with a stripe using a data strip update value, (b) a first parity strip associated with the stripe using a first parity strip update value, and (c) a second Q parity strip associated with the stripe using a second Q parity strip update value in the RAID sub-system such that the update to the first parity strip is written before writing the update to the data strip and the update to the second Q parity strip is written after writing the update to the data strip, the stripe being reconstructable based upon the first parity strip and the second Q parity strip; and creating a journal entry in a non-volatile storage medium before writing the update to the first parity strip.

11. The method of claim 10, wherein:

the journal entry comprises first identifying data within the data strip update value located at a first offset into the data strip update value, the first identifying data selected such that a comparison between the data strip update value and a pre-update data value read from the data strip results in an inequality at the first offset, and wherein the journal entry further comprises location information to locate second identifying data within the data strip at a second offset equal to the first offset upon re-boot following the unexpected RAID sub-system reset.

12. The method of claim 11, wherein the first offset and the second offset comprise byte counts.

13. The method of claim 11, wherein the location information further comprises:

a stripe identification value;

a disk drive identification value associated with a disk drive containing the data strip; and a logical block address.

14. The method of claim 11, further including:

reading the pre-update value from the data strip, a pre-update value from the first parity strip, and a pre-update value from the second parity strip, wherein the pre-update value from the data strip is read before creating the journal entry.

15. The method of claim 14, further including:

calculating the first parity strip update value using the pre-update value from the first parity strip, the pre-update value from the data strip, and the data strip update value after reading the pre-update value from the first parity strip and before writing the first parity strip update value; and calculating the second parity strip update value using the pre-update value from the second parity strip, the pre-update value from the data strip, and the data strip update value after reading the pre-update value from the second parity strip and before writing the second parity strip update value.

16. The method of claim 15, further including:

writing the first parity strip update value to the first parity strip after calculating the first parity strip update value and before writing the data strip update value;

writing the data strip update value to the data strip after writing the first parity strip update value to the first parity strip and before writing the second parity strip update value;

writing the second parity strip update value to the second parity strip after writing the data strip update value; and clearing the journal entry after writing the second parity strip update value.

17. The method of claim 16, further including:

analyzing the journal entry upon re-boot following the unexpected RAID sub-system reset, wherein the unexpected reset occurs during the disk drive updates, and wherein during the re-boot a single disk drive is detected as failed.

18. The method of claim 17, further including:

reading the first identifying data from the journal entry;

reading the location information from the journal entry to locate the second identifying data within the data strip; and reading the second identifying data from the data strip.

19. The method of claim 18, further including:

comparing the first identifying data to the second identifying data.

20. The method of claim 19, further including:

reconstructing the first parity strip using strips from non-failed disks in the stripe if the first identifying data is not equal to the second identifying data;

reconstructing the second parity strip using strips from non-failed disks in the stripe if the first identifying data is equal to the second identifying data; and reconstructing the data strip using strips from non-failed disks in the stripe if the second identifying data cannot be read from the data strip.

21. The method of claim 20, wherein the second parity strip comprises a Q strip, the pre-update value from the second parity strip comprises a pre-update value read from the Q strip, and the second parity strip update value comprises a Q strip update value.

22. The method of claim 20, wherein the first parity strip comprises a Q strip, the pre-update value from the first parity strip comprises a pre-update value read from the Q strip, and the first parity strip update value comprises a Q strip update value.

23. An article including a machine-accessible medium having associated information, wherein the information, when accessed, results in a machine performing:

sequencing write operations and journaling in a dirty stripe journal a portion of write data in a dual-parity redundant array of inexpensive disks (RAID) sub-system, the write data being for a data strip in the RAID sub-system affected by a RAID write in progress, the journaling occurring before the RAID write is allowed to update the write data and associated parity information and Q information in the RAID sub-system, the dirty stripe journal including additional information to be compared by the apparatus with the data strip to determine following an unexpected RAID sub-system reset occurring during the RAID write in progress both (1) which of the parity information and Q information is validly usable to reconstruct an invalid strip in the RAID sub-system and (2) whether the RAID write is in progress, the write operations and the journaling being sequenced such that at least one parity strip in a stripe is consistent with target stripe data during the write operations, such that the consistency of each one of the at least one parity strip is determinant following an unexpected RAID sub-system reset occurring during the write operations, and such that the at least one parity strip and the target stripe data are recoverable following both a disk drive failure and a power failure occurring while the write operations are in progress;

ordering operations associated with disk drive updates to (a) a data strip associated with a stripe using a data strip update value, (b) a first parity strip associated with the stripe using a first parity strip update value, and (c) a second Q parity strip associated with the stripe using a second Q parity strip update value in the RAID sub-system such that the update to the first parity strip is written before writing the update to the data strip and the update to the second Q parity strip is written after writing the update to the data strip, the stripe being reconstructable based upon the first parity strip and the second Q parity strip; and creating a journal entry in a non-volatile storage medium before writing the update to the first parity strip.

24. The article of claim 23, wherein:

the journal entry comprises first identifying data within the data strip update value located at a first offset into the data strip update value, the first identifying data selected such that a comparison between the data strip update value and a pre-update data value read from the data strip results in an inequality at the first offset, and wherein the journal entry further comprises location information to locate second identifying data within the data strip at a second offset equal to the first offset upon re-boot following the unexpected RAID sub-system reset.

25. The article of claim 24, wherein the information, when accessed, results in a machine performing:

analyzing the journal entry upon re-boot following the unexpected RAID sub-system reset, wherein the unexpected reset occurs during the disk drive updates, and wherein during the re-boot a single disk drive is detected as failed.

26. The article of claim 25, wherein the information, when accessed, results in a machine performing:

reading the first identifying data from the journal entry;

reading the location information from the journal entry to locate the second identifying data within the data strip; and reading the second identifying data from the data strip.

27. The article of claim 26, wherein the information, when accessed, results in a machine performing:

comparing the first identifying data to the second identifying data.

28. The article of claim 27, wherein the information, when accessed, results in a machine performing:

reconstructing the first parity strip using strips from non-failed disks in the stripe if the first identifying data is not equal to the second identifying data;

reconstructing the second parity strip using strips from non-failed disks in the stripe if the first identifying data is equal to the second identifying data; and reconstructing the data strip using strips from non-failed disks in the stripe if the second identifying data cannot be read from the data strip.

29. The article of claim 28, wherein the second parity strip comprises a Q strip, a pre-update value from the second parity strip comprises a pre-update value read from the Q strip, and the second parity strip update value comprises a Q strip update value.

30. The article of claim 28, wherein the first parity strip comprises a Q strip, a pre-update value from the first parity strip comprises a pre-update value read from the Q strip, and the first parity strip update value comprises a Q strip update value.

* * * * *